United States Patent [19]

Litel et al.

[11] 4,260,376

[45] Apr. 7, 1981

[54] DENTAL APPARATUS

[76] Inventors: James G. Litel, Box 236; George R. Hefner, P.O. Box 218, both of Coleridge, Nebr. 68727

[21] Appl. No.: 70,542

[22] Filed: Aug. 29, 1979

[51] Int. Cl.[3] .................................................. A61C 3/00

[52] U.S. Cl. ........................................ 433/29; 358/249

[58] Field of Search .................... 433/29; 358/249, 254

[56] References Cited

U.S. PATENT DOCUMENTS

| | | | |
|---|---|---|---|
| 2,805,411 | 9/1957 | Rose | 358/254 |
| 2,911,518 | 11/1959 | Anderson | 240/1.3 |
| 3,072,738 | 1/1963 | Epps, Jr. et al. | 358/249 |
| 3,415,571 | 12/1968 | Heimert | 433/29 |
| 3,819,855 | 6/1974 | Rush et al. | 358/249 |
| 3,950,086 | 4/1976 | Schulman et al. | 433/29 |
| 4,005,261 | 1/1977 | Sato et al. | 273/183 R |

FOREIGN PATENT DOCUMENTS 2505798 8/1976 Fed. Rep. of Germany ............ 433/29

OTHER PUBLICATIONS

Ritter Brochure, 4–29–41, "New Horizons".

*Primary Examiner*—Gene Mancene
*Assistant Examiner*—John J. Wilson
*Attorney, Agent, or Firm*—Henderson & Sturm

[57] ABSTRACT

This invention relates to dental illumination apparatus in general, and more specifically to a combined focused dental light and audio-visual instrument which will distract, entertain and educate a patient upon whom the light is focused, to reduce the anxiety and psychosomatic pain experienced by a patient undergoing routine dental procedures.

1 Claim, 4 Drawing Figures

FIG. 2
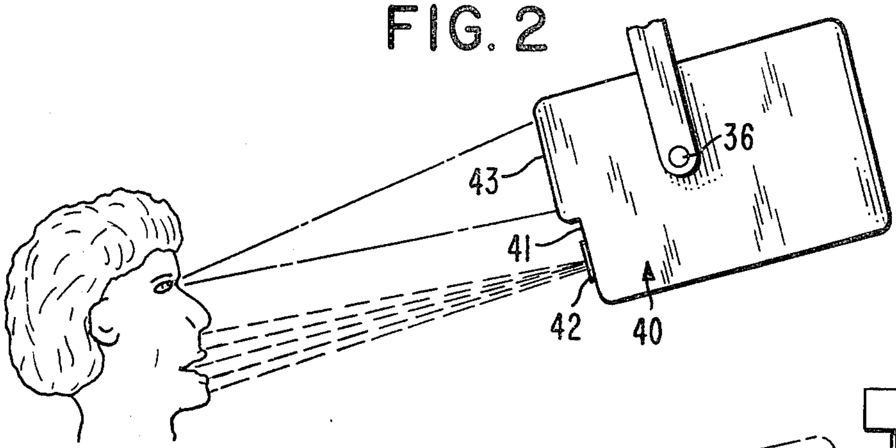
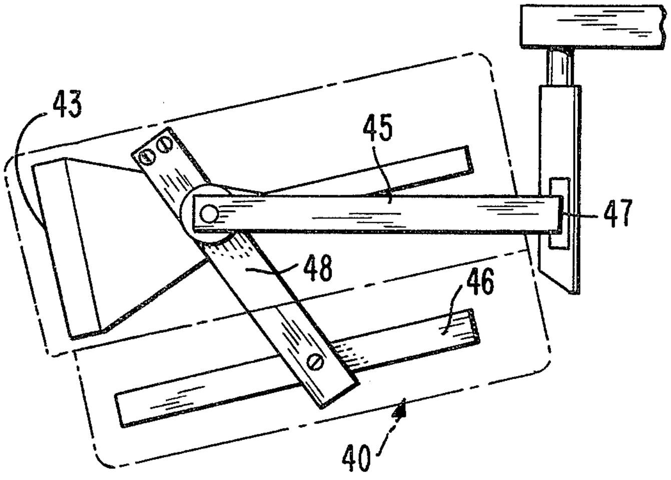
FIG. 3
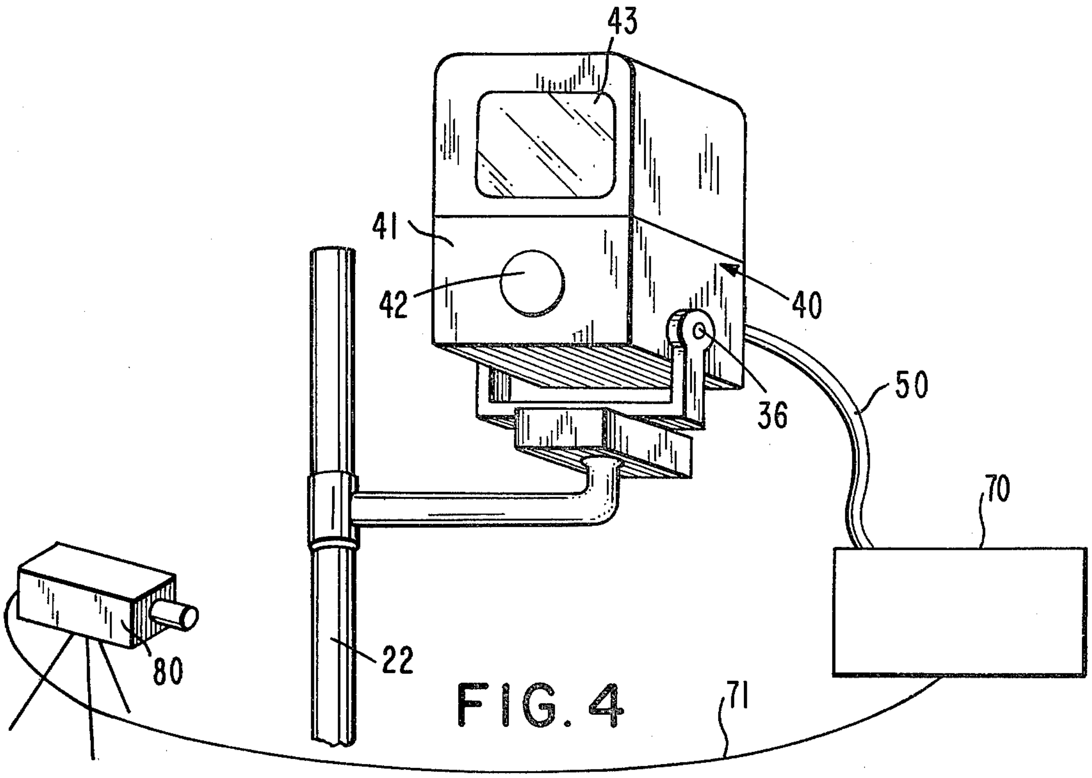
FIG. 4

DENTAL APPARATUS

BACKGROUND OF THE INVENTION

It is a well accepted physiological phenomena that the mental attitude of a person subjected to pain stimulus will dictate the level of pain which is registered on the individual's consciousness. Fear and anxiety are also known to heighten the sensation of pain which a person will experience when subjected to a given stimulus. It is also well accepted that audio and visual stimuli can mask pain stimulus to levels that are usually acceptable to the individual in the absence of anesthesia.

It is further accepted that familiarity with a subject will lessen anxiety and thereby reduce the conscious level of pain experienced by a person subjected to a given stimulus.

Practioners in the field of dentistry are particularly sensitive to the real and imagined pain which their patients experience, and they are constantly attempting to allay their patient's fears and anxieties. One of the ways that they attempt to relax their patients is to explain and illustrate the procedure that they are about to perform.

Dentists realizing that a relaxed and distracted patient has a higher tolerance for pain, have for years used music to help mask the pain stimulus inherent in dental procedures, and only recently have they begun to employ visual stimuli to distract and relax their patients prior to and possibly during the actual dental procedure (Dental Survey, October 1978, page 11, col. 2).

To date, there has not been devised a system which will accomplish the functions of education, distraction and entertainment with the resultant lessening of anxiety, relaxation, and increased tolerance to pain, which will also function in combination with a dental light to allow the dentist to direct the light into the patient's mouth, while at the same time adjusting the visual stimuli so that they patient does not have to crane his neck to maintain visual contact.

SUMMARY OF THE INVENTION

An object of the present invention is to provide an illumination source in combination with an audio-visual stimuli to reduce or mask the effects of pain stimulus on a dental patient.

A further object of this invention is to provide a device which will entertain, distract and educate a viewer undergoing a routine dental procedure.

Still another object of this invention is the provision of a device which will provide illumination for a dentist to perform dental procedures, while positioning an audio-visual element in alignment with the viewer/-patient's head.

A still further object of this invention is the provision of a device which will allow the incorporation of a recording camera which can record and/or playback a dental procedure on the audio-visual element for instructional purposes, record keeping, etc.

BRIEF DESCRIPTION OF THE DRAWINGS

FIG. 2 is a side view of the unit illustrating the area of illumination of a patient's face, and also the sphere of visual perception afforded the viewer;

FIG. 3 is a side view of the combined device, illustrating the mounting means which can be adapted to any standard dental lighting fixture;

FIG. 4 is a perspective view of a modified version of the combined television/dental light, incorporating a recording camera, and further illustrates the remote cabinet which houses the circuitry for the unit.

DESCRIPTION OF THE PREFERRED EMBODIMENT

Figure 1:
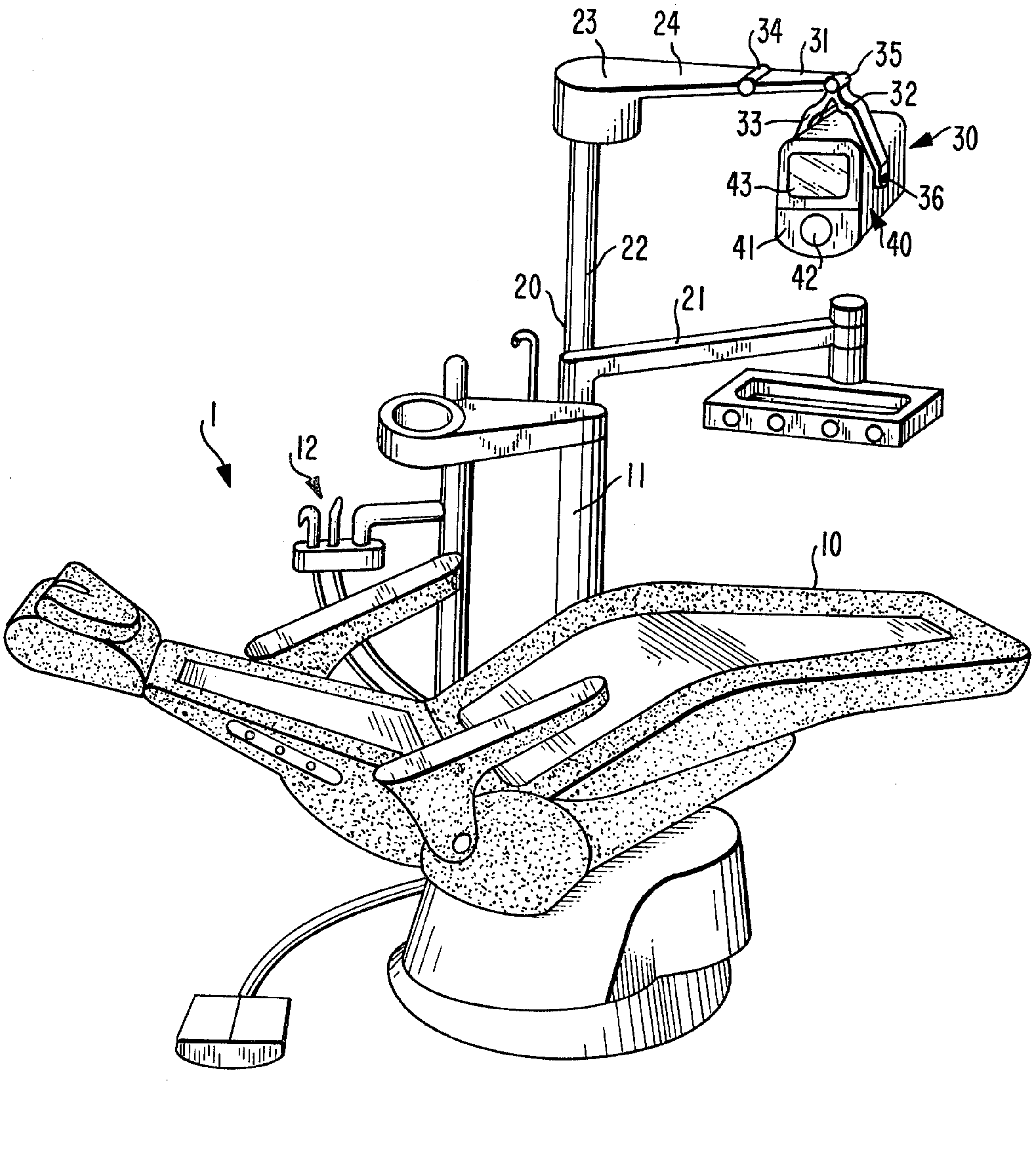
FIG. 1 is a perspective view of the combined television/dental light as it would appear mounted on or adjacent to a standard dental chair.

FIG. 1 illustrates a preferred embodiment of the combined dental light and audio visual device 40 which forms the basis for the instant invention. The environment in which this device is employed is designated generally as 1, and comprises a standard reclining dental chair 10 and an instrument stand 11. The instrument stand 11 normally houses a spigot and drain along with at least one support 12 for assorted dental paraphanalia. Projecting from the top of the instrument stand 11 is a vertical column 20 having a lower pivoted extension 21 which supports a movable instrument tray and an upper tublar extension 22 which terminates in a support housing 23.

Extending at a right angle to the support housing 23 is a rigid cantilevered member 24 which pivotally supports the combined dental light and audio-visual device 40 through a pivoted articulated support structure designated generally as 30. The support structure 30 comprises a depending arm 31 pivotally connected on one end (as at 34) to the rigid member 24, and pivotally connected on the other end (as at 35) to a bifurcated support member having two arms 32, 33 which are further pivotally attached to the device 40.

The combined dental light and audio-visual device 40 comprises a housing 41 which contains a dental light fixture 42 and a Cathode Ray Tube assembly 43 having a diagonal screen size 6" or less. Referring to FIG. 3, it can be seen that the light fixture 42 is supported in a standard light bracket or framework 45 which has a mounting flange 46 secured to its forward end. The CRT assembly is secured to the mounting flange 46 by suitable securing means 47 and further attached to the horizontal support on the light bracket 45 via an apertured angled support arm 48. The angle support arm 48 is pivotally attached to the bifurcated support members 32, 33 and the electrical wiring for the combined dental light and CRT assembly passes through the same internal conduits (not shown) which normally house the wiring for the dental light alone. The circuitry for the TV is housed in a separate remote cabinet connected by an umbilical cord shown in FIG. 4.

As can be seen by reference to FIG. 2, the articulated support frame 30 is designed to pivot to a position which will align the area of illumination emminating from the dental light so that it will flood the patient's lower face with light while preventing the light from impinging upon the patient's eyes. Since the television is mounted directly above the dental light and the television screen is in the same vertical plane as the lens of the dental light, it should be obvious that the dentist can manipulate the unit 40 to provide sufficient illumination of the patient's mouth to perform normal dental procedures while avoiding the obstruction of the patient's view of the television.

Referring now to FIG. 4, it can be seen that the combined dental light and audio visual device 40 can be rotatably and pivotally supported on any upright support member 22. The Cathode Ray Tube assembly 43 and dental light 42 have their respective wiring combined into a single umbilical cord 50 which connects the respective components to their associated circuitry which is housed in a remote cabinet 70. The cabinet 70 containing the CRT assembly circuitry may also be provided with a suitable electrical connection 71 to a video recording camera 80. The advantage of this addition, to the device 40 is to provide the capabilities of recording and/or playing back the dental procedure as it is being performed. The recording feature allows medical or legal records to be established, and the records can further be utilized for reference or instructional materials as well as scientific presentations.

By placing all of the circuitry for the Cathode Ray Tube assembly 43 in a remote cabinet 70, the overall weight of the combined assembly 40 is substantially reduced and requires a much smaller housing 41 for the components. The use of a common umbilical cord 50, to house the wiring for the components, allows the wiring to be hidden from view by inserting it inside the upright support 22 for a more aesthetically pleasing appearance than the arrangement illustrated in FIG. 4.

It should be appreciated by now that the unit 40 can be adapted to any standard dental light fixture such as a stationary or track mounted, pivoted over-head light, or a separate, self-supported pivoted unit. It should also be apparent that the television could be provided with an earphone jack so that the patient could listen to the audio portion without disturbing the dentist's concentration. Another option which is available with the unit, is a pre-recorded cassette capability to allow the patient to view a particular program or demonstrations of proper dental hygiene, which currently consumes a significant portion of the time devoted to an individual patient, thereby freeing the dentist and his staff to spend their time pursuing other endeavors.

As can be seen by the above detailed description of the invention, the combined dental light and television of the instant invention fulfills all of the objectives set forth supra. The patients can be educated, relaxed and entertained during the dental procedure without interferring with, or restricting the dentist's movements. The patient's anxieties, fears and tension are substantially reduced thereby providing the therapeutic benefits of increased tolerance to pain and reduced reliance on anesthesia.

Having thereby disclosed the subject matter of this invention, it should be obvious that many modifications, substitutions and variations of the invention are possible in light of the above teachings. It is therefore to be understood, that the invention may be practiced other than as specifically described, and should be limited only by the breadth and scope of the appended claims.

What we claim is:

1. An improved dental apparatus to be used to educate, entertain and relax a patient during normal dental procedures comprising:

a pivoted articulated dental light support structure with at least two pivoted sections connected together for relative rotations, one of which pivoted sections comprises a pivotally connected bifurcated support element;

a dental light with operative electrical wiring, and a lens supported in a framework having a horizontal support member and secured to said support structure;

a television type cathode ray tube audio-visual member with operative wiring mounted on top of said dental light, operatively connected to a remote housing which contains the cathode ray tube circuitry, with a recording camera operatively connected to the cathode ray tube circuitry, said audio-visual member mounted on said dental light framework by both an apertured mounting flange secured to the ends of said bifurcated support element, and a pair of apertured support arms further securing the audio-visual member to the dental light framework;

a single housing surrounding both said cathode ray tube audio-visual member and said dental light, located external said dental light framework and between the bifurcated members of said bifurcated support elements, wherein said dental light lens and said audio-visual member are mounted in the same vertical plane;

a vertical column means for securing said articulated dental light support structure, said vertical column means affixed to one of said pivoted sections; and an umbilical cord means for enclosing said dental light operative electrical wiring and said cathode ray tube operative wiring within a single cord hidden from view within said vertical column.

* * * * *